United States Patent
Oberdorfer

(10) Patent No.: US 6,788,334 B2
(45) Date of Patent: Sep. 7, 2004

(54) DEVICE AND METHOD FOR INSPECTING HOLLOW SPACES

(76) Inventor: Hans Oberdorfer, Rezatweg 33, Nürnberg (DE), D-90449

( * ) Notice: Subject to any disclaimer, the term of this patent is extended or adjusted under 35 U.S.C. 154(b) by 0 days.

(21) Appl. No.: 09/981,300

(22) Filed: Oct. 16, 2001

(65) Prior Publication Data

US 2002/0080234 A1 Jun. 27, 2002

Related U.S. Application Data

(63) Continuation of application No. PCT/DE00/00429, filed on Feb. 15, 2000.

(30) Foreign Application Priority Data

Apr. 16, 1999 (DE) .......................... 199 17 150

(51) Int. Cl.[7] .................................. H04N 7/18
(52) U.S. Cl. .................... 348/84; 348/82; 134/167; 134/168; 134/169; 134/103; 239/226; 239/227; 239/246; 239/247; 239/397; 239/548; 73/622; 73/625; 427/230
(58) Field of Search ............................ 348/84, 85, 82; 239/390, 226, 548, 225, 231, 246, 247, 397, 227, 237; 134/113, 167 C, 168 C; 427/230; 73/622, 625, 628, 644

(56) References Cited

U.S. PATENT DOCUMENTS 3,655,122 A * 4/1972 Brown et al. ............... 239/226
4,800,104 A * 1/1989 Cruickshank ............... 427/230
5,018,545 A * 5/1991 Wells .......................... 134/113
5,174,155 A * 12/1992 Sugimoto ..................... 73/622
5,884,847 A * 3/1999 Christopher ................. 239/390
5,947,387 A * 9/1999 Zink et al. ................... 239/227
6,111,600 A * 8/2000 McLeod et al. .............. 348/84
6,360,757 B1 * 3/2002 Bohrer ........................ 134/113

FOREIGN PATENT DOCUMENTS

| DE | 44 26 939 A1 | 2/1996 | |
| FR | 2 768 214 | 11/1999 | |
| GB | 2 228 644 A * | 8/1990 | ............ H04N/7/18 |
| SU | 585262 A * | 12/1977 | ............ B05B/13/06 |
| WO | WO 95/03526 | 2/1995 | |

* cited by examiner

Primary Examiner—Shawn S. An
(74) Attorney, Agent, or Firm—Thomas R. Vigil; Welsh & Katz, Ltd.

(57) ABSTRACT

The invention relates to a device for inspecting hollow spaces such as pipes, conduits, structures or containers. The device consists of the following: a probe with a built-in camera (5.0) whose objective is oriented towards a front end of a base body (1.0) of said probe; a hose-type supply line to the probe for a liquid or gaseous medium, said line being connected to the back end of the base body of said probe; a supply unit for the hose-type supply line, which is situated outside of the area where the probe is being used; at least one outlet nozzle (3.0) for the medium, which is located on the probe; and transmission means which are provided between the camera (5.0) and an evaluating and/or reproducing unit. At least three rotating outlet nozzles for the medium are situated on the periphery of the base body (1.0) between its front and back end and the jet axis of the medium is angled at 0° to 45° from the central longitudinal axis between the front and back end of the base body (1.0).

6 Claims, 2 Drawing Sheets

FIGUR 1
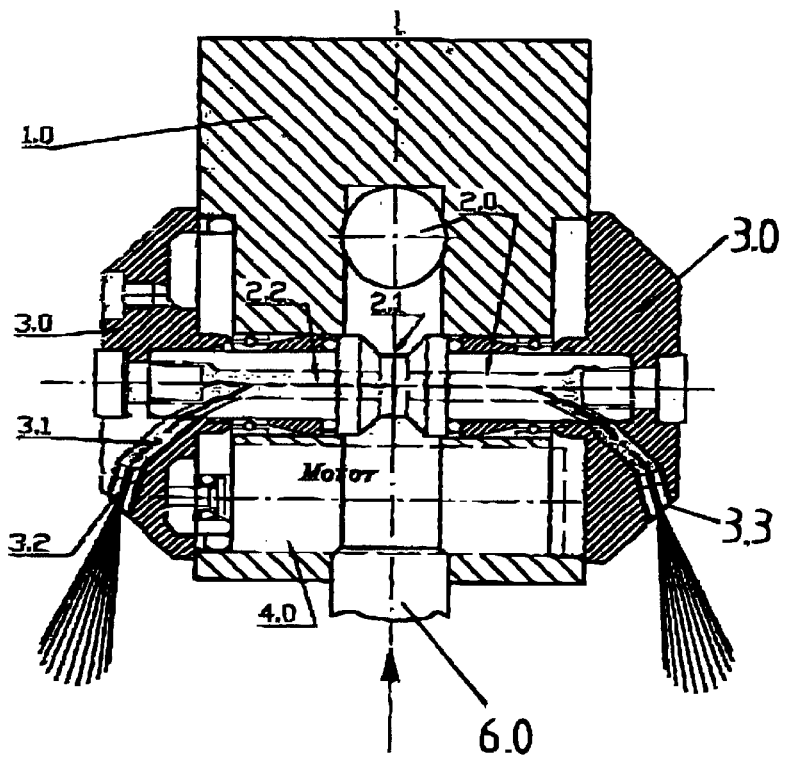
FIGUR 2
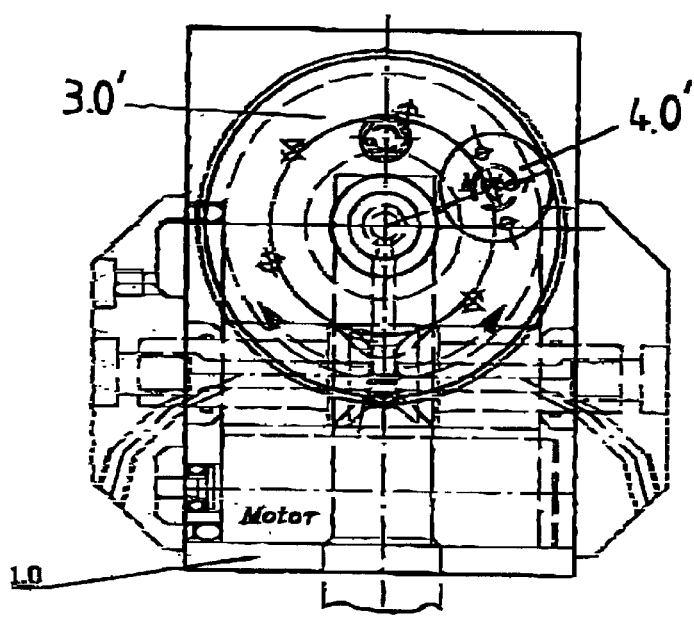

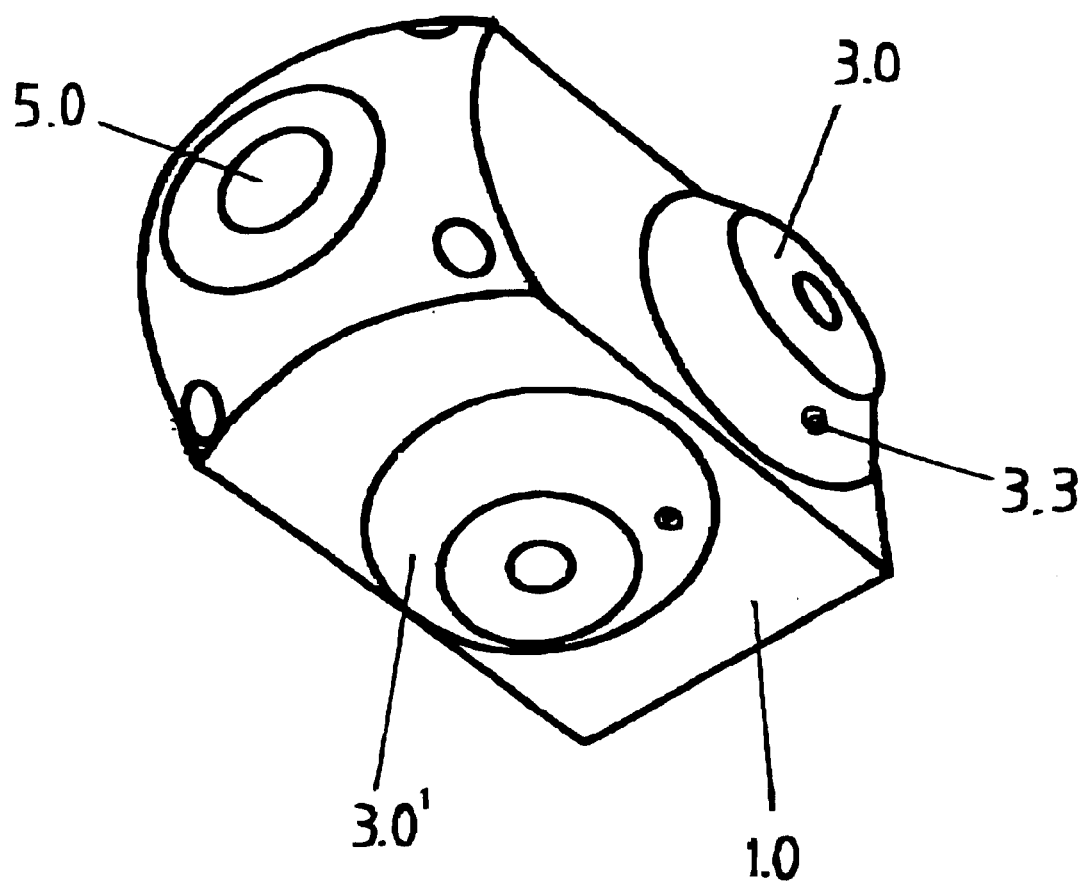

DEVICE AND METHOD FOR INSPECTING HOLLOW SPACES

This application is a division of International application number PCT DE00 00429 filed Feb. 15, 2000.

The invention relates to a device and a method for inspecting hollow spaces having the features recited in the preamble of claim 1.

The DE-C-40 31 715, DE-A-38 03 274, DE-U-91 05 211 and DE-C-42 29 787 disclose methods and devices for inspecting conduits by image transmission that permit to introduce a second camera system into pipes branching from the main pipe using the assistance of a carriage located therein. Nozzles are also known to be used for cleaning sewers in which the outlet openings are arranged in such a manner that they are capable of supplying the thrust necessary to draw along a supply hose. These pipe cleaning nozzles are also known to be used as a driving element for introducing inspection cameras. However, the heretofore known techniques do not permit the inspection of very long lines with small dimensions, the wheel-driven camera being no longer able to pull the cable. In addition, these techniques are not capable of circumventing obstacles and branch lines are still difficult to inspect. Although the above mentioned method, which is directed to introduce second cameras into the branch lines, solves the problem of inspecting such branch lines, it does not allow to overcome obstacles. Furthermore, the expense of technical requirements and staff is increased since two camera systems have to be monitored.

Therefore, it is an object of the present invention to provide a device and a method for inspecting hollow spaces such as conduits and the like that permit to introduce a base member carrying a camera into branch lines and by means of which obstacles may be overcome. It is another object of the invention to make it possible to make for any desired location in large containers or buildings by means of the device according to the invention.

The solution to this object is achieved by the features recited in the characterizing part of claim 1. Developments and advantageous embodiments of the invention are comprised in the other claims.

According to the invention, a device for inspecting hollow spaces such as pipes, conduits, buildings or containers and consisting of a probe with a built-in camera whose objective is oriented toward a front end of a base member of the probe, of a hose line for supplying a liquid or gaseous medium to the probe, said line being connected to the back end of the base member of said probe, of a supply unit for the hose supply line which is situated outside the site of utilization of the probe, of at least one outlet nozzle for the medium which is located on the probe, and of transmission means which are provided between the camera and an evaluating and/or imaging unit, is characterized in that at least three rotatable outlet nozzles for the medium are arranged on the periphery of the base member between its front and back end, the axis of the jet of the medium being angled at an angle of 0° to 45° from the central longitudinal axis between the front and back end of the base member.

There are preferably provided four rotatable outlet nozzles whose axes of rotation are offset by 90 degrees across the central longitudinal axis of the base member. The outlet nozzles are preferably rotatable 360 degrees and are driven by at least one electric servomotor.

Outside the hollow space to be inspected, a control and feeding cable is arranged between the servomotor and a control unit.

The rotatable outlet nozzles are preferably in the shape of a disk or of a flat cone and are non-rotatably carried on axles that are arranged at right angles. Preferably, the respective outlet openings of the nozzles are arranged on the periphery of the disk or flat cone, respectively.

The axles are preferably devised as hollow axles for the transportation of the medium from the hose supply line to the outlet nozzles and the axes of the jet of the medium exiting the outlet openings are oriented toward the respective one of the central longitudinal axes of the hollow axles.

According to a particular embodiment of the invention, the probe is equipped with a gyrometer. According to other advantageous realizations of the invention, further testing and measuring instruments and/or sensors are arranged, in addition to the camera, in or on the base member.

A method for inspecting hollow spaces such as pipes, conduits, buildings or containers in accordance with the invention involves the following steps:

connecting a probe according to the claims 1 through 11 to a supply unit with a liquid or gaseous medium by means of a hose supply line, introducing the probe into the hollow space to be inspected, admitting a pressurized medium into the probe, controlling the rotatable nozzles by way of the control cable such that the probe is held in the free space on one side and that, on the other side, a recoil force develops, advancing the probe into the respective hollow space and evaluating the results.

Hereinafter the invention will be described in more detail by way of example with reference to the drawing.

FIG. 1 is a sectional view through the base member 1.0 and illustrates the march of the pressure means;

FIG. 2 is a top view of the base member of FIG. 1;

FIG. 3 is a perspective view of the base member of FIG. 1 and FIG. 2.

According to FIG. 1, the camera probe is moved by preferably four rotary nozzles, two opposite rotary nozzles 3.0, 3.0 and 3.0', 3.0' being respectively solidly connected through an axle 2.0 by way of which they are supplied with the pressurized medium. A very compressed or gaseous medium is brought to the connection 6.0 of the base member 1.0 via a pressure-proof hose. Said connection bore 6.0 leads past the right-angled axles 2.0 of the rotary nozzles 3.0, 3.0', which are devised as hollow axles for this purpose, to the rotary nozzles 3.0, 3.0' in the shape of a flat cone and from there, via the supply bores 2.1 (bore of the hollow axle) and 3.1 (angled admission in the rotary nozzle), to the outlet openings 3.3 on the conical periphery of the rotary nozzles 3.0, 3.0'. The outlet openings 3.3 on the conical periphery of the rotary nozzles 3.0, 3.0' are arranged such that the jet axes 3.2 of the nozzles meet with the geometric center of the axles 2.0. As a result thereof, the drive for the motion of rotation is completely uncoupled from the considerable feed forces. This is necessary to prevent dynamic forces from acting onto the servomotors 4.0 or from having to be overcome during controlling and, as a result thereof, the drive unit can be chosen to have very small dimensions. The servomotors 4.0 are small electric motors that may be arranged such that four motors drive a respective one of the nozzles or that one motor with change gear drives two rotary nozzles at the same time. It makes thereby sense to symmetrically arrange the base member 1.0, the axles 2.0 and the rotary nozzles 3.0 since the side forces are subtracted from each other as a result thereof, which also contributes in reducing the energy of the controlling process. The motors are supplied and driven by way of cables (not shown). FIG. 2 shows how the second pair of rotary nozzles 3.0', with the associated motors, is arranged on the base member 1.0 in such a manner that it is offset relative to the first pair of rotary nozzles 3.0 to provide rotational symmetry.

For a better understanding of the geometrical shape, FIG. 3 shows the base member 1.0 in a perspective view, hose supply and cable having been omitted. Base member 1.0 is substantially rectangular in cross section and carries the lens 5.0 of the built-in camera on a slightly arcuate front end, said camera supplying the pictures to the outside via cables or cableless. The pairs of rotary nozzles 3.0 and 3.0' with their respective outlet openings 3.3, which are offset relative to each other so as to provide rotational symmetry, are located on the four side faces of base member 1.0.

At operation with a gaseous pressurized medium and at controlling bulk containers, the servo control is assisted by a precise gyrometer. As a result thereof, it is possible to absolutely quietly head for the desired destination.

What is claimed is:

1. A device for inspecting hollow spaces such as pipes, conduits, building or containers comprising a probe with a built-in camera (5.0) whose objective is oriented toward a front end of a base member (1.0) of the probe, a hose line for supplying a liquid or gaseous medium to the probe, said line being connected to the back end of the base member of said probe, a supply unit for the hose supply line which is situated outside the site for utilization of the probe, transmission means which are provided between the camera and an evaluating and/or imaging unit, four rotary, probe-propelling, outlet nozzles (3.0) for the medium arranged on a side wall of the base member (1.0) between its front and back end, the axes of rotation of the outlet nozzles being offset by 90 degrees across the central longitudinal axis of the base member, two opposite rotary nozzles (3.0, 3.0') being respectively solidly connected through an axle (2.0) by way of which they are supplied with the pressurized medium, the axis of the jet of the medium being angled at an angle of 0° to 45° from the central longitudinal axis between the front and back end of the base member, said rotatable outlet nozzles being rotatable 360 degrees, said rotatable outlet nozzles being driven by at least one electric servomotor (4.0), and said rotatable outlet nozzles (3.0, 3.0') being in the shape of one of a disk or a flat cone and are non-rotatably carried on axles that are arranged at right angles, the respective outlet openings (3.3) of said nozzles being arranged on the sidewall of one of the disk or the flat cone, respectively the axles (2.0) being constructed as hollow axles (2.1) for the transportation of the medium from the hose supply line to the outlet nozzles and, control means are provided for controlling the rotatable nozzles such that the probe is held free in space and such that a recoil, propelling force is developed to advance the probe.

2. The device according to claim 1, characterized in that said control means include a control and feeding cable arranged between the servomotor (4.0) and a control unit.

3. The device according to claim 2, characterized in that the probe is equipped with a gyro meter.

4. The device according to claim 1, characterized in that the axles of the jet of the medium exiting the outlet openings (3.3) are oriented toward the respective one of the central longitudinal axes of the hollow axles.

5. The device according to claim 1, characterized in that further testing and measuring instruments and/or sensors are arranged in or on the base member in addition to the camera.

6. A method for inspecting hollow spaces such as pipes, conduits, building or containers involving the following steps:

connecting a probe having four probe-propelling nozzles which are driven by at least one electric servomotor (4.0) and which are in the shape of one of a disk or a flat cone and are non-rotatably carried on axles that are arranged at right angles, the axes of rotation of the outlet nozzles being offset by 90 degrees across the central longitudinal axis of the probe, and the axis of the jet of the medium is angled at 0 degree to 45 degrees from the longitudinal axis of the device, two opposite rotary nozzles (3.0, 3.0') being respectively solidly connected through an axle (2.0) by way of which they are supplied with the pressurized medium, and the outlet nozzles being rotatable 360 degrees, the respective outlet openings (3.3) of the nozzles being arranged on a sidewall of one of the disk or the flat cone, respectively and the axles (2.0) being constructed as hollow axles (2.1) for the transportation of the medium from the hose supply line to the outlet nozzles, and having a built-in camera whose objective is oriented toward a front end of a base member of the probe to a supply unit with a liquid or gaseous medium by means of a hose supply line that supplies the probe-propelling nozzles, introducing the probe into the hollow space to be inspected, admitting a pressurized medium into the probe, controlling the rotatable nozzles by way of the control cable such that the probe is held in the free space on one side and that, on the other side, a recoil, propelling force develops, advancing the probe into the respective hollow space and evaluating the results.

\* \* \* \* \*